(12) United States Patent
Jung et al.

(10) Patent No.: US 12,514,309 B2
(45) Date of Patent: Jan. 6, 2026

(54) WEARABLE AIRBAG

(71) Applicant: HYUNDAI MOBIS CO., LTD., Seoul (KR)

(72) Inventors: Dae Chang Jung, Yongin-si (KR); Seok Hoon Ko, Yongin-si (KR); Tae Hyeong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 239 days.

(21) Appl. No.: 18/494,323

(22) Filed: Oct. 25, 2023

(65) Prior Publication Data
US 2024/0306738 A1    Sep. 19, 2024

(30) Foreign Application Priority Data
Mar. 14, 2023    (KR) .................. 10-2023-0033420

(51) Int. Cl.
*A41D 13/05*    (2006.01)
(52) U.S. Cl.
CPC ................. *A41D 13/0556* (2013.01)
(58) Field of Classification Search
CPC .......... A41D 2600/10; A41D 2600/102; A41D 2600/104; A41D 1/00; A41D 1/04; A41D 1/084; A41D 13/00; A41D 13/015; A41D 13/05; A41D 13/0512; A41D 13/0518; A41D 13/055; A41D 13/0556; A41D 13/11; A41D 13/1161; B60R 2021/03; B60R 2021/0039; B60R 2021/0044; B60R 2021/0058; B60R 2021/0088; B60R 2021/01532; B60R 2021/01534; B60R 2021/01536; B60R 2021/02; B60R 2021/23; B60R 2021/231; B60R 2021/36; B60R 21/00; B60R 21/01; B60R 21/01034; B60R 21/0104; B60R 21/01068; B60R 21/01075; B60R 21/01088; B60R 21/01102; B60R 21/01109; B60R 21/01286; B60R 21/01512; B60R 21/01528; B60R 21/0153; B62J 27/00; B62J 27/20; H01H 35/00; H01H 35/02; H01H 36/00; H01H 71/24; H01H 2050/16; H01H 2050/166; H01H 2071/048; F02D 41/10; B60W 30/04
USPC ...................................... 200/61.62
See application file for complete search history.

(56) References Cited

FOREIGN PATENT DOCUMENTS

| CN | 118510425 A | * | 8/2024 | ............ A41D 13/018 |
| CN | 119855514 A | * | 4/2025 | ............ A41D 1/002 |
| KR | 10-2478257 B1 | | 12/2022 | |

* cited by examiner

*Primary Examiner* — Anthony R Jimenez
(74) *Attorney, Agent, or Firm* — NovoTechIP International PLLC

(57) ABSTRACT

A wearable airbag includes an attachment unit, which is provided at the wearable airbag and a counterpart wearable airbag so as to structurally connect the wearable airbag to the counterpart wearable airbag, the counterpart wearable airbag being worn at a location on a user's body adjacent to a location at which the wearable airbag is worn, and an electrical connection unit configured to transmit and receive an electrical signal to the counterpart wearable airbag in a state in which the wearable airbag is coupled to the counterpart wearable airbag via the attachment unit.

9 Claims, 12 Drawing Sheets

WEARABLE AIRBAG

CROSS-REFERENCE TO RELATED APPLICATIONS

This application claims the priority benefit of Korean Patent Application No. 10-2023-0033420, filed on Mar. 14, 2023 in the Korean Intellectual Property Office, the disclosure of which is incorporated herein by reference.

TECHNICAL FIELD

The present invention relates to a wearable airbag capable of being worn on a human body.

BACKGROUND

In order to improve safety of a passenger who employs a transportation vehicle, such as an electric scooter, an electric bicycle and a motorcycle, which is not additionally provided with an external structure configured to protect the passenger, wearable airbags are being developed.

The wearable airbags are being developed so as to be configured to individually protect various regions of a human body, such as a head, a chest and a pelvis, rather than to wholly protect a human body, so as to allow free movement of a user and to enable a user to selectively configure various types of usage.

In other words, in consideration of various types of usage in which a user riding on an electric bicycle usually wears only a head protection airbag and a user riding on an electric scooter usually wears a head protection airbag and a chest protection airbag, wearable airbags, which are configured to individually protect various regions of a human body, are mainly being developed.

Details described as the background art are intended merely for the purpose of promoting an understanding of the background of the present invention and should not be construed as an acknowledgment of the prior art that is already known to those of ordinary skill in the art.

SUMMARY

Therefore, the present invention has been made in view of the above problems, and it is an object of the present invention to provide a wearable airbag, which is configured to be combined with a plurality of wearable airbags, which are configured to respectively protect various regions of a human body, in order to easily fulfill a function of protecting a desired region of a user's body, and which is configured to be structurally and functionally coupled to the plurality of wearable airbags in a simple structural and coupling manner in order to allow the plurality of coupled wearable airbags to function and operate as a single system, thereby further efficiently fulfilling a function of protecting a user's body.

In accordance with the present invention, the above and other objects can be accomplished by the provision of a wearable airbag including an attachment unit, which is provided at the wearable airbag and a counterpart wearable airbag so as to structurally connect the wearable airbag to the counterpart wearable airbag, the counterpart wearable airbag being worn at a location on a user's body adjacent to a location at which the wearable airbag is worn, and an electrical connection unit configured to transmit and receive an electrical signal to the counterpart wearable airbag in a state in which the wearable airbag is coupled to the counterpart wearable airbag via the attachment unit.

The attachment unit may include a zipper, a button, or a clip which enables the wearable airbag to be detachably connected to the counterpart wearable airbag.

The attachment unit may include a combination of two or more selected from among a zipper, a button, and a clip which enable the wearable airbag to be detachably connected to the counterpart wearable airbag.

The electrical connection unit may include magnets, which are respectively mounted on the wearable airbag and the counterpart wearable airbag so as to be brought into contact with each other via magnetic force of the magnets and which include an electroconductive material in at least a portion thereof to transmit and receive an electrical signal to and from the counterpart airbag.

The magnets may be composed of electroconductive materials so as to transmit and receive an electrical signal to and from the counterpart airbag.

Each of the magnets may include an electrical connection pin embedded therein, which is exposed at an end thereof from a surface of the magnet that is opposed to a magnet mounted on the counterpart wearable airbag.

The electrical connection unit may include electrical connectors, which are respectively provided at the wearable airbag and the counterpart wearable airbag so as to correspond to each other.

The electrical connection unit may include an electrical bridge configured to be electrically connected to the counterpart wearable airbag in a state in which the wearable airbag is coupled to the counterpart wearable airbag via the attachment unit.

When the attachment unit includes a zipper, the electrical bridge may be provided at a slider of the zipper, and contact electrodes may be respectively provided at the wearable airbag and the counterpart wearable airbag so as to be connected to each other via the electrical bridge of the slider.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
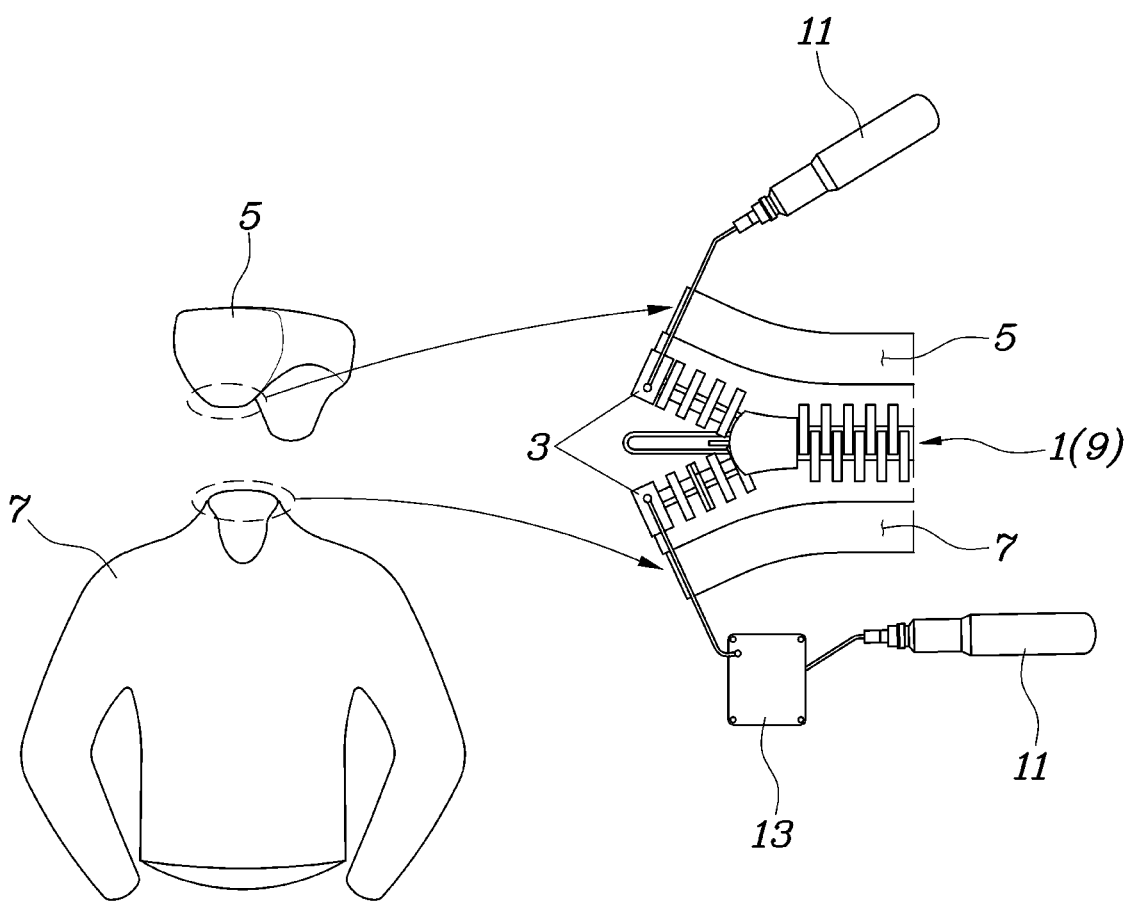
FIG. 1 is a view illustrating a wearable airbag according to the present invention and a counterpart wearable airbag to be connected to the wearable airbag.

A description will now be given in detail according to exemplary embodiments disclosed herein, with reference to the accompanying drawings. For the sake of brevity of description with reference to the drawings, the same or equivalent components may be denoted by the same reference numbers, and a description thereof will not be repeated.

In general, suffixes such as "module" and "unit", when used in the following description, may be used to refer to elements or components for easy preparation of the specification. The use of such suffixes herein is merely intended to facilitate the description of the specification, and the suffixes do not imply any special meaning or function.

Furthermore, in the following description of embodiments disclosed herein, if it is decided that a detailed description of known functions or configurations related to the invention would make the subject matter of the invention unclear, such detailed description is omitted. The accompanying drawings are used to assist in easy understanding of various technical features, and it should be understood that the embodiments presented herein are not limited by the accompanying drawings. As such, the present disclosure should be construed to extend to any alterations, equivalents, and substitutes, in addition to those which are particularly set out in the accompanying drawings.

It will be understood that although the terms "first", "second", etc. may be used herein to describe various elements, these elements should not be construed as being limited by these terms. These terms are only used to distinguish one element from another.

It should be understood that, when an element is referred to as being "connected to" another element, there may be intervening elements present, or the element may be directly connected with another element. In contrast, it should be understood that, when an element is referred to as being "directly connected to" another element, there are no intervening elements present.

A singular representation may include a plural representation unless the context clearly indicates otherwise.

Terms such as "includes" or "has" used herein should be considered as indicating the presence of various features, numbers, steps, operations, elements, components or combinations thereof disclosed in the specification, but it should be understood that the presence or addition of one or more other features, numbers, steps, operations, elements, components or combinations thereof is not excluded.

Referring to FIGS. 1 to 12, a wearable airbag according to an embodiment of the present invention includes an attachment unit 1 which is provided at the wearable airbag and a counter wearable airbag, which are worn at adjacent locations on a human body, so as to structurally connect the wearable airbag to the counterpart wearable airbag, and an electrical connection unit 3, which is connected to the counterpart wearable airbag so as to transmit and receive electrical signals to and from the counterpart wearable airbag in the state in which the wearable airbag is coupled to the counterpart wearable airbag via the attachment unit 10.

Here, the phrase "worn at adjacent locations on a human body" means the relationship between a head protection wearable airbag 5 and a chest protection wearable airbag 7, which are respectively worn on the head and the chest of a human body which are located adjacent to each other.

In the position of the head protection wearable airbag 5, the chest protection wearable airbag 7 becomes the counterpart wearable airbag to be connected. In the position of the chest protection wearable airbag 7, the head protection wearable airbag 5 becomes the counterpart wearable airbag to be connected.

Specifically, according to the present invention, the wearable airbags, which are connected to each other in the above-described manner, are structurally coupled to and separated from each other by means of the attachment unit 1, and electrical signals are transmitted between the wearable airbags, which are connected to each other, by connection and separation of the electrical connection unit 3 such that the wearable airbags, which are connected to each other, are expanded in conjunction with each other and offer functions and operation as in a single system, thereby more efficiently fulfilling a function of protecting a user's body.

Furthermore, according to the present invention, by virtue of the attachment unit 1 and the electrical connection unit 3, a plurality of wearable airbags are assembled with each other in order to easily fulfill a function of protecting a desired region of a user's body.

FIG. 1 illustrates the construction in which the head protection wearable airbag 5 and the chest protection wearable airbag 7 are connected to each other by means of the attachment unit 1. Here, the chest protection wearable airbag 7 may be considered to be the wearable airbag according to the present invention while the head protection wearable airbag 5 may be considered to be the counterpart wearable airbag to be connected.

In FIG. 1, the head protection wearable airbag 5, which is the counterpart wearable airbag, is connected to the lower chest protection wearable airbag 7, which is the wearable airbag, by means of a zipper 9 which serves as the attachment unit 1. The head protection wearable airbag 5 and the chest protection wearable airbag 7 are provided with respective inflators 11. The chest protection wearable airbag 7 is provided with an airbag controller 13 in order to control the inflator 11 of the chest protection wearable airbag 7 and to also control the inflator 11 of the counterpart wearable airbag in the state in which the electrical connection unit 3 is connected.

The attachment unit 1 may be embodied as a zipper 9, a button 15, or a clip 17 so as to connect and separate the wearable airbag 7 to and from the counterpart wearable airbag 5.

Furthermore, the attachment unit 1 may also be embodied as a combination of two or more of the zipper 9, the button 15 and the clip 17.

Figure 2:
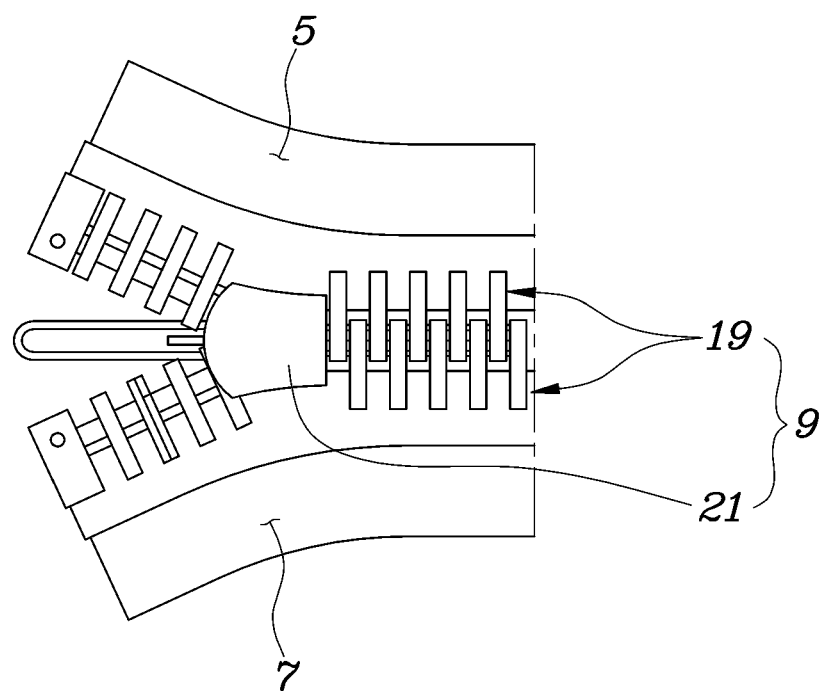
FIG. 2 is a view illustrating an attachment unit which is composed of a zipper.

FIG. 2 illustrates an example in which the zipper 9 is used as the attachment unit 1. In this example, two rows of teeth, which constitute the zipper 9, are respectively coupled to the head protection wearable airbag 5 and the chest protection wearable airbag 7, and are coupled to each other or separated from each other by movement of a slider 21.

Figure 3A:
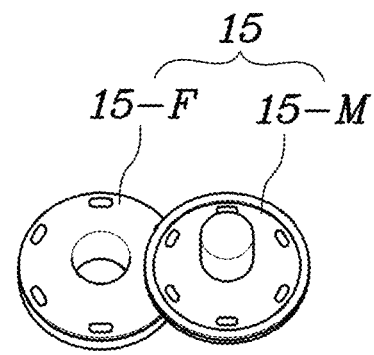
FIG. 3A is a perspective view of a male button and a female button for use in the attachment unit.
Figure 3A:
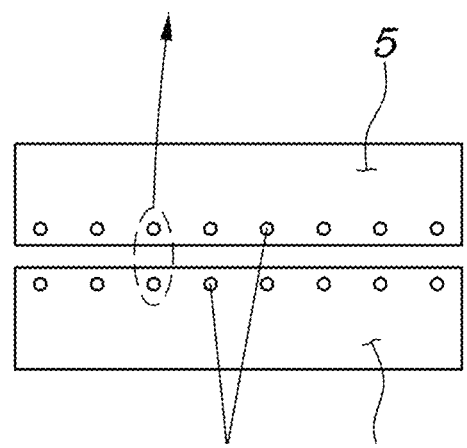
Figure 3B:
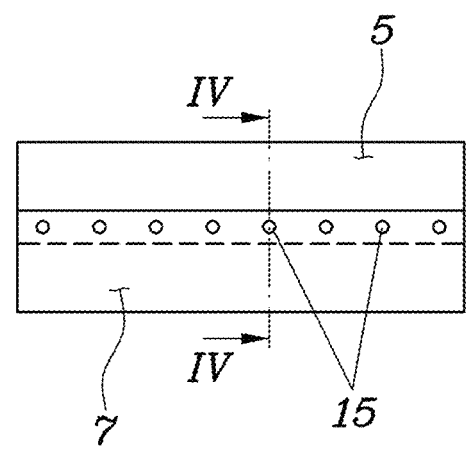
FIG. 3B shows the attachment unit with male buttons on one side of the attachment unit and the female buttons on the other side of the attachment unit and with the male and female buttons in a first position where they are spaced apart from each other and in a second position where they are coupled to each other.
Figure 4:
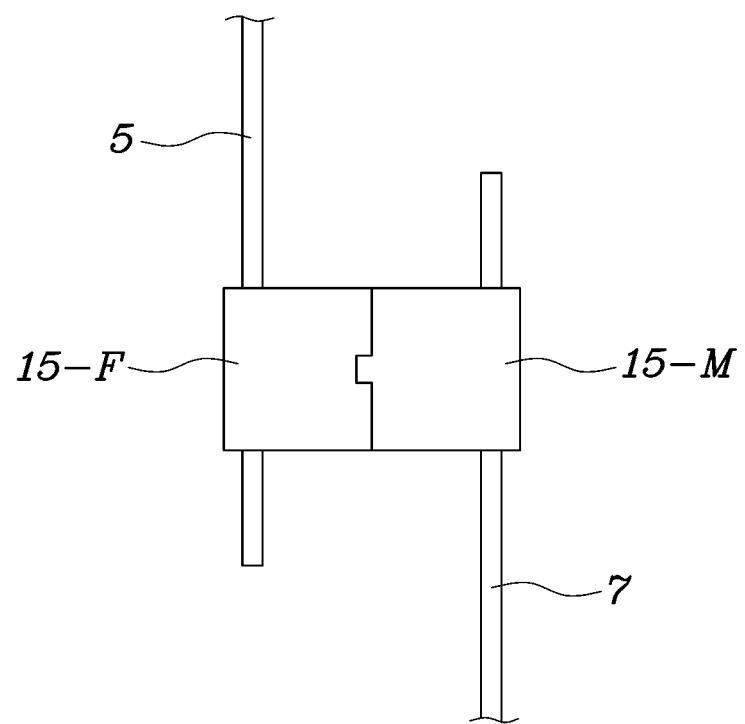
FIG. 4 is a cross-sectional view taken along line IV-IV in FIG. 3B.

FIGS. 3A, 3B, and 4 illustrate an example in which the attachment unit 1 is embodied as a button 15. In this example, the head protection wearable airbag 5 and the chest protection wearable airbag 7 are respectively provided with a female button 15-F and a male button 15-M, which respectively include a hole and a protrusion so as to be elastically coupled to each other by pushing force.

In this example, the button 15, which is coupled both to the head protection wearable airbag 5 and the chest protection wearable airbag 7, may not be composed of the abovementioned male button 15-M and female button 15-F instead being substituted by a magnetic button which is composed of a magnet having an N polarity and a magnet having an S polarity.

Figure 5A:
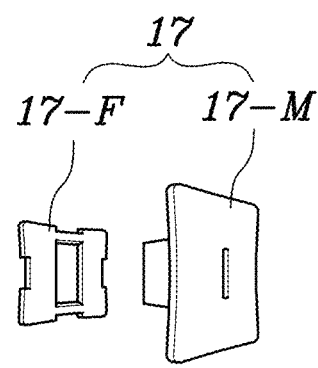
FIG. 5A is a view of a male clip and a female clip for use in the attachment unit.
Figure 5A:
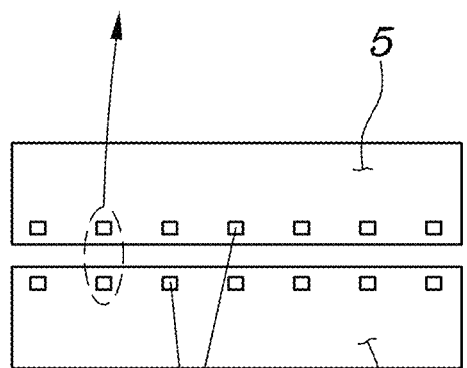
Figure 5B:
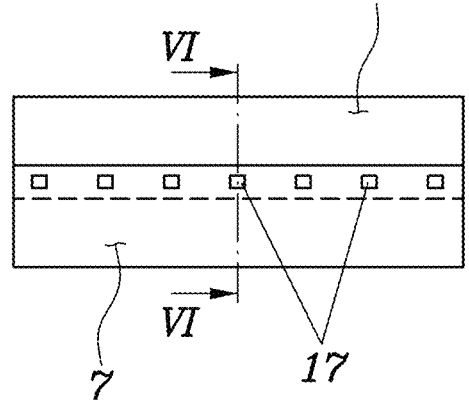
FIG. 5B shows the attachment unit with male clips on one side of attachment unit and female clips on the other side of the attachment unit and with the male and female clips in a first position where they are spaced apart from each other and in a second position where they are coupled to each other.
Figure 6:
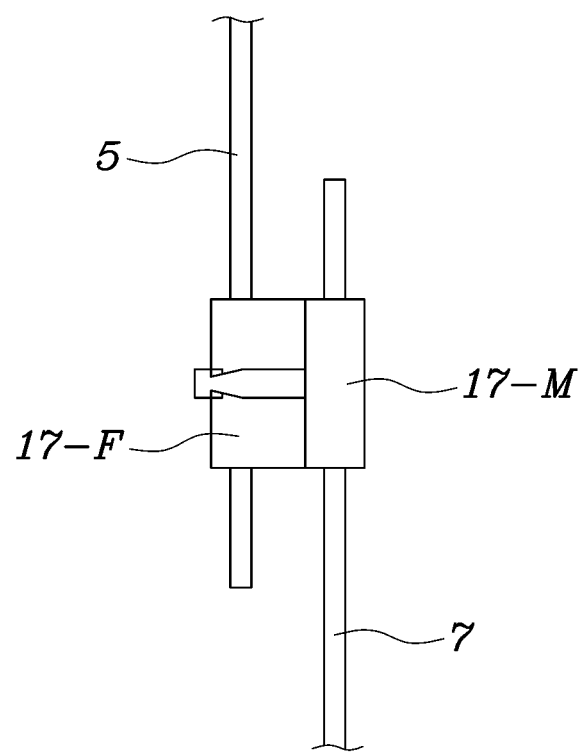
FIG. 6 is a cross-sectional view taken along line VI-VI in FIG. 5B.

FIGS. 5A, 5B and 6 illustrate an example in which the attachment unit 1 is embodied as a clip 17. In this example, the head protection wearable airbag 5 and the chest protection wearable airbag 7 are respectively provided with a female clip 17-F and a male clip 17-M, as illustrated in FIG. 5A. Consequently, the head protection wearable airbag 5 and the chest protection wearable airbag 7 are structurally and integrally coupled to each other via the coupling between the male clip 17-M and the female clip 17-F.

Figure 7:
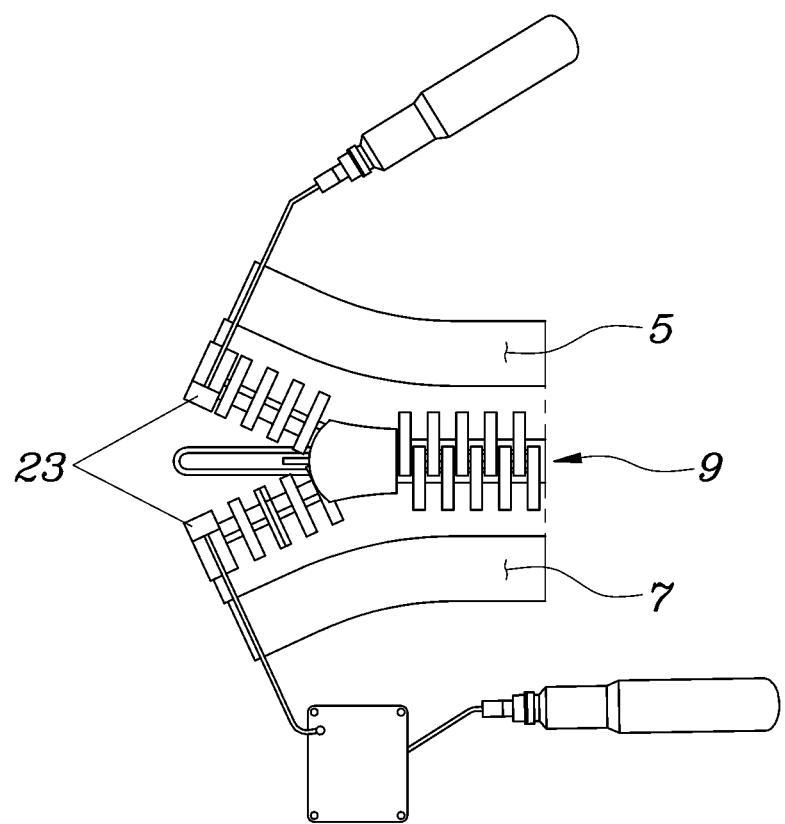
FIG. 7 is a view illustrating an electrical connection unit which is composed of magnets.

Referring to FIG. 7, the electrical connection unit 3 may be composed of magnets 23, which are respectively mounted on the wearable airbag and the counterpart wearable airbag so as to be brought into contact with each other by the magnetic force of the magnets and which include an electroconductive material in at least a portion thereof in order to transmit and receive electrical signals to and from the wearable airbags.

Figure 8:
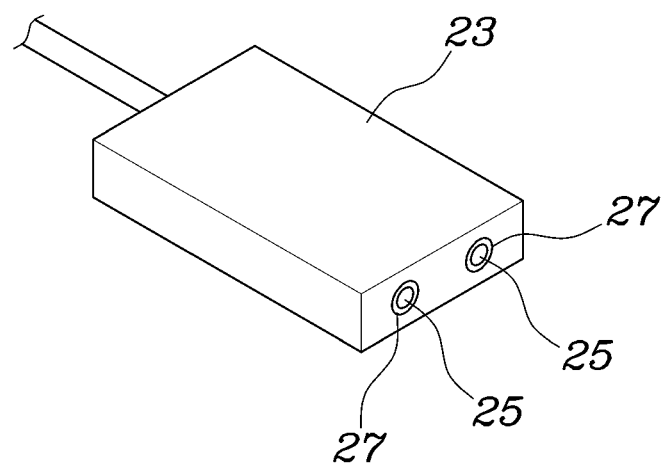
FIG. 8 is a view illustrating the electrical connection unit including an electrical connection pin embedded therein.

Here, each of the magnets 23 may be composed of an electroconductive material so as to serve as a component configured to transmit and receive electrical signals to and from the opposing wearable airbag to be connected, as illustrated in FIG. 7. Furthermore, each of the magnets 23 may be configured to include therein an electrical connection pin 25, which is exposed from the surface of the magnet 23 that is opposed to the magnet 23 mounted on the opposed wearable airbag, as illustrated in FIG. 8.

Here, the electrical connection pin 25 is preferably embedded in the magnet 23 with an insulation material 27 interposed therebetween.

Figure 9:
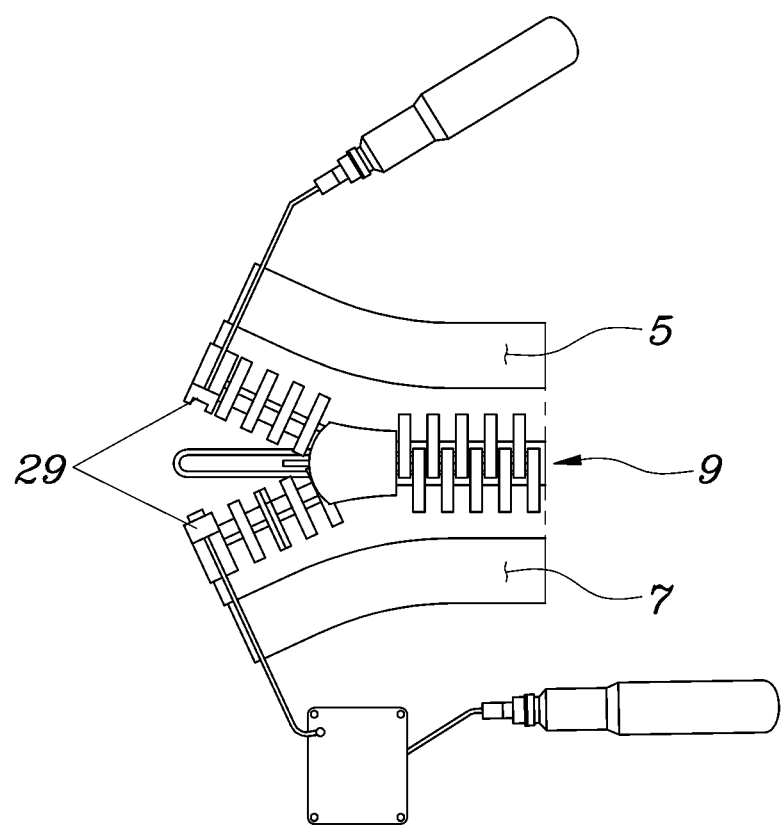
FIG. 9 is a view illustrating the electrical connection unit which is composed of an electrical connector.

As illustrated in FIG. 9, the electrical connection unit 3 may be composed of electrical connectors 29, which are mounted on the two wearable airbags so as to correspond to each other.

Here, each of the electrical connectors 29 may have a structure in which one or more conductive pins are embedded in a conventional plastic body.

Figure 10A:
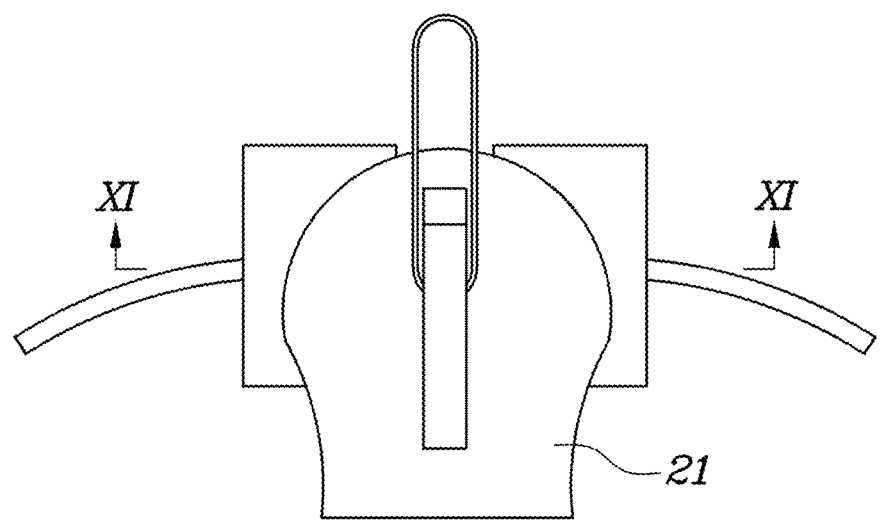
FIG. 10A is a view illustrating the slider of a zipper with opposing sides of the attachment unit positioned therein and conductors of the electrical connection unit extending from the opposing sides of the attachment unit.
Figure 10B:
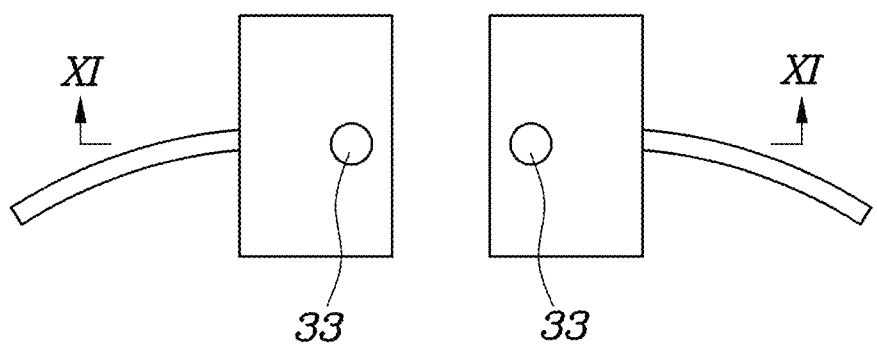
FIG. 10B shows the opposing sides of the attachment unit of FIG. 10A without the slider such that contact electrodes for the electrical connection unit are visible.
Figure 11A:
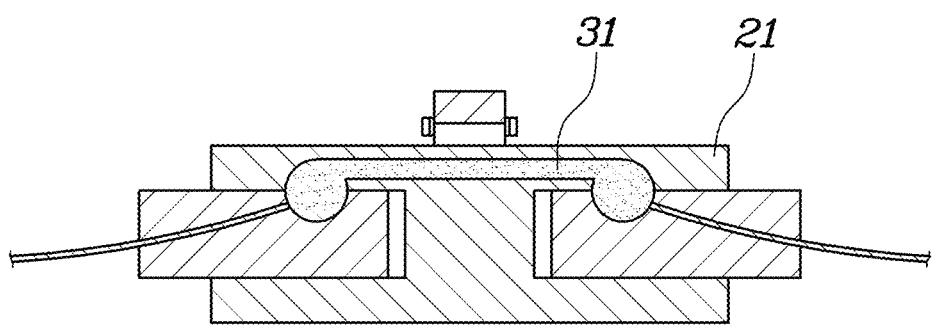
FIG. 11A and FIG. 11B show cross-sectional views taken along line XI-XI of FIG. 10A and FIG. 10B, respectively.
Figure 11B:
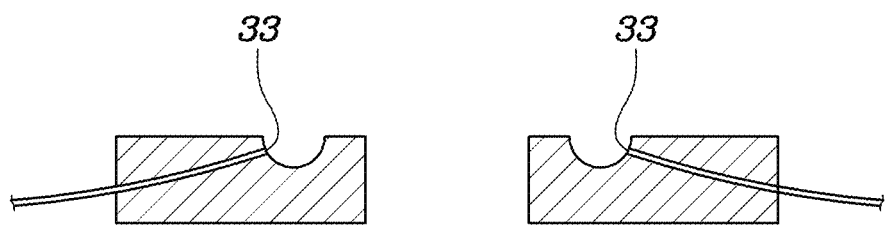
Figure 12:
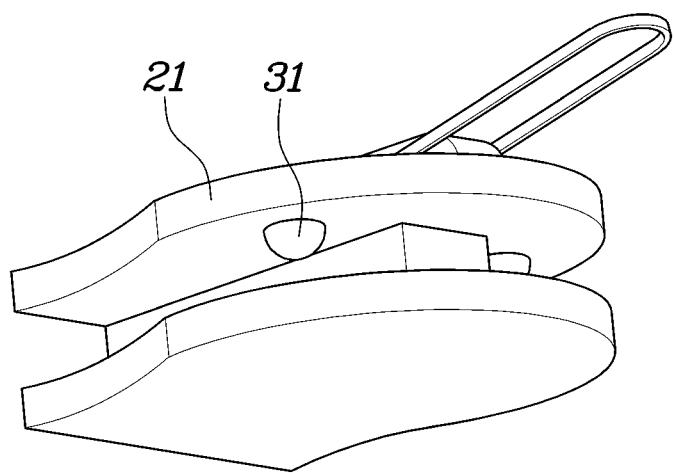
FIG. 12 is a perspective view of the slider shown in FIG. 10.

As illustrated in FIGS. 10 to 12, the electrical connection unit 3 may include an electrical bridge 31 provided at the attachment unit 1 so as to be electrically connected to the two wearable airbags in the state in which the two wearable airbags are coupled to each other by means of the attachment unit 1.

In this embodiment, the attachment unit 1 is composed of a zipper 9. Here, the electrical bridge 31 is provided at the slider 21 of the zipper 9, and contact electrodes 33 are respectively provided at the wearable airbag and the counterpart wearable airbag so as to be connected to each other via the electrical bridge 31 of the slider 21.

Specifically, the contact electrodes 33 are disposed at a predetermined location of the head protection wearable airbag 5 and at a corresponding location of the chest protection wearable airbag 7, and the electrical bridge 31, which is provided at the slider 21 of the zipper 9 constituting the attachment unit 1, electrically connects the two contact electrodes 33 to each other when the slider 21 moves to the two contact electrodes 33.

For reference, in each of the FIGS. 10 and 11, the state in which the electrical bridge 31, which is the electrical connection unit 3, electrically connects the two contact electrodes 33 to each other is shown at the upper side, and the state in which the connection between the two contact electrodes 33 is interrupted is shown at the lower side for comparison.

In summary, the present invention enables a plurality of wearable airbags to be structurally and electrically connected to and separated from each other with ease. Consequently, it is possible to combine the plurality of wearable airbags with each other to easily fulfill a function of protecting a desired portion of a user and to provide functions and operation of expanding the plurality of wearable airbags, which are connected to each other, simultaneously or at regular time intervals as in a single system, thereby further efficiently fulfilling a function of protecting a user's body.

As is apparent from the above description, the present invention enables a plurality of wearable airbags, which are configured to respectively protect various regions of a human body, to be combined with each other in order to easily fulfill a function of protecting a desired region of a user's body, and enables the plurality of wearable airbags to be structurally and functionally coupled to each other in a simple structural and coupling manner in order to allow the plurality of coupled wearable airbags to function and operate as a single system, thereby further efficiently fulfilling a function of protecting a user's body.

Although the preferred embodiments of the present invention have been described above with reference to the accompanying drawings, those skilled in the art will appreciate that the present invention can be implemented in various other embodiments without changing the technical ideas or features thereof.

What is claimed is:

1. A wearable airbag comprising:
   an attachment unit configured to connect the wearable airbag to a counterpart wearable airbag, the counterpart wearable airbag being worn at a location on a user's body adjacent to a location at which the wearable airbag is worn; and
   an electrical connection unit configured to transmit and receive an electrical signal to and from, respectively, the counterpart wearable airbag when the wearable airbag is connected to the counterpart wearable airbag via the attachment unit.

2. The wearable airbag according to claim 1, wherein the attachment unit comprises a zipper, a button, or a clip which enables the wearable airbag to be detachably connected to the counterpart wearable airbag.

3. The wearable airbag according to claim 1, wherein the attachment unit comprises a combination of two or more selected from among a zipper, a button, and a clip which enable the wearable airbag to be detachably connected to the counterpart wearable airbag.

4. The wearable airbag according to claim 1, wherein the electrical connection unit comprises electrical connectors, which are respectively provided at corresponding positions on the wearable airbag and the counterpart wearable airbag.

5. The wearable airbag according to claim 1, wherein the electrical connection unit comprises an electrical bridge configured to be electrically connected to the counterpart wearable airbag when the wearable airbag is connected to the counterpart wearable airbag via the attachment unit.

6. The wearable airbag according to claim 5, wherein, when the attachment unit comprises a zipper, the electrical bridge is provided at a slider of the zipper, and contact electrodes are respectively provided at the wearable airbag and the counterpart wearable airbag which are configured to be connected to each other via the electrical bridge of the slider.

7. The wearable airbag according to claim 1, wherein the electrical connection unit comprises magnets on the wearable airbag which are configured to be brought into contact with magnets on the counterpart wearable airbag via magnetic force, the electrical signal being transmitted and received via electroconductive materials of the magnets on the wearable airbag.

8. The wearable airbag according to claim 7, wherein the magnets are composed of the electroconductive materials.

9. The wearable airbag according to claim 7, wherein each of the magnets comprises an electrical connection pin embedded therein, which is exposed at an end thereof from a surface of the magnet.

\* \* \* \* \*